F. L. NICHOLS.
PISTON.
APPLICATION FILED JUNE 7, 1905.

953,389.

Patented Mar. 29, 1910.

Witnesses:
F. G. Hachenberg.
Henry Thieme

Inventor:
Frank L. Nichols
By Brown & Seward
his Attorneys

UNITED STATES PATENT OFFICE.

FRANK L. NICHOLS, OF STAMFORD, CONNECTICUT, ASSIGNOR OF ONE-HALF TO MARSHALL HERRINGTON, OF ARLINGTON, NEW JERSEY.

PISTON.

953,389.  Specification of Letters Patent.  Patented Mar. 29, 1910.

Original application filed November 2, 1904, Serial No. 231,051. Divided and this application filed June 7, 1905. Serial No. 264,051.

*To all whom it may concern:*

Be it known that I, FRANK L. NICHOLS, a citizen of the United States, and resident of Stamford, in the county of Fairfield and State of Connecticut, have invented a new and useful Improvement in Pistons, of which the following is a specification.

My invention relates to pistons and more particularly to pistons for use in hydrocarbon motors.

My present invention is a division of my pending application Serial No. 231051, filed November 2, 1904, and is directed to the production of a piston which, while lubricated and working in the cylinder with a close sliding fit, will not be liable to become overheated by the high heat in the combustion chamber.

Figure 1:
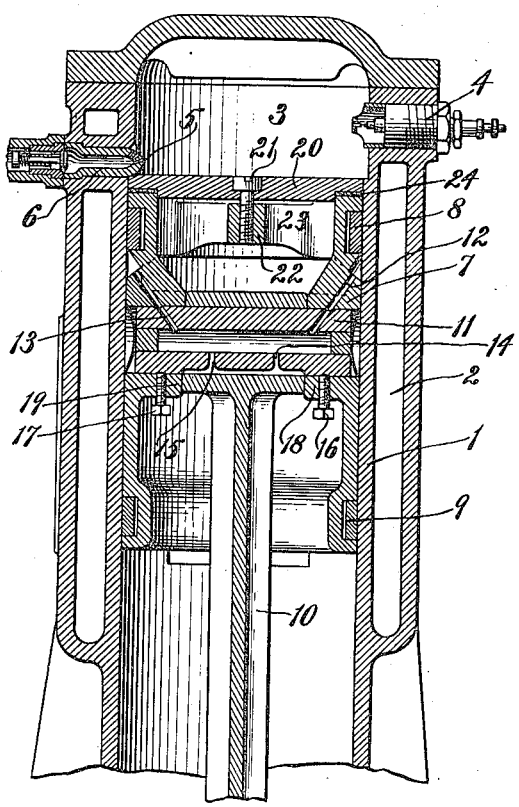
Figure 2:
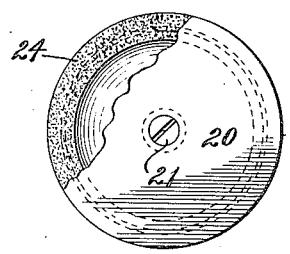

In the accompanying drawings, Figure 1 is a section of a portion of a cylinder with the piston in position therein, and Fig. 2 is an end view of the piston partly broken away to show the piston and the non-heat-conducting diaphragm.

The cylinder in which the piston is adapted to reciprocate is denoted by 1. It is surrounded by a cooling chamber 2. The vaporizing and combustion chamber is denoted by 3. A plug 4 for holding the electric exploder in position is removably secured in the wall of the cylinder and the mixture of air and hydrocarbon, in the present instance kerosene enters the vaporizing and combustion chamber 3 through small openings 5 in the end of the hollow injecting plug 6.

The body of the piston is denoted by 7. It is a hollow cylinder provided with suitable packing rings 8 and 9 seated in peripheral grooves thereon and it is connected to its rod 10 by means of a cross pin 11 seated in the walls of the body 7 and preferably made hollow for transmitting a lubricant through ducts 12 and 13 to the exterior of the body of the piston and through ducts 14, 15, to the exterior of the cross pin where it is engaged by the piston rod 10. The cross pin 11 may be locked to the body 7 by set screws 16, 17, extending through interior flanges 18, 19.

To prevent the heat resulting from the explosion of the mixture in the chamber 3 from unduly heating the piston and burning the lubricating oil, a trouble which has heretofore been common, the advance end 20, of the piston is made independent of the body portion and is secured to the body portion by means of a screw 21 or other suitable fastening, extending through it into the hub 22 connected with the body of the piston by arms 23. Intermediate of the separable end 20 and the body of the piston there is interposed an annular gasket 24 of some non-heat-conducting material, for example, asbestos. This prevents the hot end 20 of the piston from communicating heat to any serious extent to the body of the piston and hence the lubricant, which is employed to cause the piston to slide freely within the cylinder, will not become burned and will not gum and thereby prevent the free sliding movement of the piston in starting it after the engine has been for any cause temporarily stopped.

What I claim is:—

The combination with a combustion chamber provided with means for admitting an explosive mixture therein, of a piston arranged to be actuated by the products of combustion, the said piston comprising a hollow cylindrical stem or body portion open at its forward end and a head connected with the body of the piston and serving to close the open forward end of the stem or body portion, the said head being separated from the body of the piston by a suitable non-heat-conducting gasket interposed between the head and stem or body portion.

In testimony, that I claim the foregoing as my invention, I have signed my name in presence of two witnesses, this 2nd day of June 1905.

FRANK L. NICHOLS.

Witnesses:
 FREDK. HAYNES,
 C. S. SUNDGREN.